US008526938B1

(12) United States Patent
Gardner

(10) Patent No.: US 8,526,938 B1
(45) Date of Patent: Sep. 3, 2013

(54) TESTING MOBILE PHONE MAINTENANCE CHANNEL

(75) Inventor: Jeffrey L. Gardner, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 116 days.

(21) Appl. No.: 13/085,284

(22) Filed: Apr. 12, 2011

(51) Int. Cl.
 *H04W 24/00* (2009.01)
(52) U.S. Cl.
 USPC .............. 455/423; 455/432.1; 455/435.1; 455/433; 455/551
(58) Field of Classification Search
 USPC .............. 455/432.1, 423, 435.1, 433, 551
 See application file for complete search history.

(56) References Cited

U.S. PATENT DOCUMENTS

| 7,164,920 B2 * | 1/2007 | Giacalone et al. ............ 455/455 |
| 8,249,582 B1 * | 8/2012 | Abou-El-Ella et al. ....... 455/423 |
| 8,335,507 B1 * | 12/2012 | Mangal ...................... 455/432.3 |
| 8,351,934 B1 * | 1/2013 | Schmitt et al. ............... 455/433 |
| 2007/0123231 A1 * | 5/2007 | Kim ........................... 455/414.1 |
| 2007/0169093 A1 * | 7/2007 | Logan et al. ................ 717/168 |
| 2008/0108321 A1 * | 5/2008 | Taaghol et al. ............... 455/410 |
| 2008/0146223 A1 * | 6/2008 | Welnick et al. ............... 455/434 |
| 2010/0093349 A1 * | 4/2010 | Gandhi et al. ............... 455/435.2 |
| 2010/0174974 A1 * | 7/2010 | Brisebois et al. ............ 715/223 |
| 2011/0124338 A1 * | 5/2011 | Krause et al. ............... 455/435.1 |
| 2011/0275364 A1 * | 11/2011 | Austin et al. ................ 455/423 |
| 2012/0142327 A1 * | 6/2012 | Urbanek ...................... 455/418 |
| 2012/0258690 A1 * | 10/2012 | Chen et al. .................. 455/411 |
| 2012/0289216 A1 * | 11/2012 | Urbanek ...................... 455/418 |

* cited by examiner

*Primary Examiner* — Lester Kincaid
*Assistant Examiner* — Mehmood B Khan

(57) ABSTRACT

A method of testing a mobile phone maintenance channel is provided. The method comprises transmitting a plurality of mobile phone activation set-up messages to an open mobile alliance (OMA) platform, the OMA platform storing activation set-up information in a data store, and generating test activation request messages. The method further comprises transporting the activation request messages over a mobile phone maintenance channel, the OMA platform retrieving activation set-up information from the data store, the OMA platform transmitting activation response messages, the activation response messages comprising at least a portion of the mobile phone activation set-up information associated with the test activation request, transporting the activation response messages over the maintenance channel, and the computer, in response to receiving the activation response messages, determining a first test result based on comparing the plurality of activation request messages to the activation response messages.

7 Claims, 6 Drawing Sheets

TESTING MOBILE PHONE MAINTENANCE CHANNEL

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile telephones are electronic devices used for mobile voice or data communication based on network connectivity provided by base stations known as cell towers or sites. The Open Mobile Alliance (OMA) is a standards body which develops open standards for the mobile phone industry. An open mobile alliance platform may provide provisioning, configuration, and software update functions to mobile telephones.

SUMMARY

In an embodiment, a method of testing a mobile phone maintenance channel is disclosed. The method comprises transmitting a plurality of mobile phone activation set-up messages to an open mobile alliance (OMA) platform. The open mobile alliance platform stores the mobile phone activation set-up information provided in the mobile phone activation set-up messages in a data store. A plurality of test mobile phone activation request messages are automatically generated on a computer and transported over a mobile phone maintenance channel, where the mobile phone maintenance channel comprises a communication path between the computer and the open mobile alliance platform. In response to the receiving the test mobile phone activation request messages, the open mobile alliance platform retrieves mobile phone activation set-up information corresponding to test mobile phone activation request messages from the data store. The open mobile alliance platform transmits a plurality of test mobile phone activation response messages, the test mobile phone activation response messages comprising at least a portion of the mobile phone activation set-up information associated with the test mobile phone activation request. The test mobile phone activation response messages are transported over the mobile phone maintenance channel. In response to receiving the mobile phone activation response messages, the computer determines a first test result based on comparing the plurality of test mobile phone activation request messages to the plurality of test mobile phone activation response messages.

In an embodiment, a method of testing a mobile phone maintenance channel is disclosed. The method comprises transmitting a plurality of mobile phone activation set-up messages to an open mobile alliance (OMA) platform. The open mobile alliance platform stores the mobile phone activation set-up information provided in the mobile phone activation set-up messages in a data store. A plurality of test mobile phone activation request messages are automatically generated on a computer and transported over a mobile phone maintenance channel, where the mobile phone maintenance channel comprises a communication path between the computer and the open mobile alliance platform. In response to the receiving the test mobile phone activation request messages, the open mobile alliance platform retrieves mobile phone activation set-up information corresponding to test mobile phone activation request messages from the data store. The open mobile alliance platform transmits a plurality of test mobile phone activation response messages, the test mobile phone activation response messages comprising at least a portion of the mobile phone activation set-up information associated with the test mobile phone activation request. The test mobile phone activation response messages are transported over the mobile phone maintenance channel. In response to receiving the mobile phone activation response messages, the computer determines a first test result based on comparing the plurality of test mobile phone activation request messages to the plurality of test mobile phone activation response messages and automatically generates a plurality of test mobile phone preferred roaming list request messages. The test mobile phone preferred roaming list request messages are transported over the mobile phone maintenance channel. In response to receiving the test mobile phone preferred roaming list request messages, the open mobile alliance platform retrieves mobile phone preferred roaming list information from the data store. The open mobile alliance platform transmits a plurality of test mobile phone preferred roaming list response messages, the test mobile phone preferred roaming list response messages comprising at least a portion of the test mobile phone preferred roaming list information retrieved from the data store. The test mobile phone preferred roaming list response messages are transported over the mobile phone maintenance channel. In response to receiving the test mobile phone firmware response messages, the computer determines a third test result based on comparing the plurality of test mobile phone preferred roaming list request messages to the plurality of test mobile phone preferred roaming list response messages and automatically generates a plurality of test mobile firmware request messages. The test mobile phone firmware request messages are transported over the mobile phone maintenance channel. In response to receiving the test mobile phone firmware request messages, the open mobile alliance platform retrieves mobile phone firmware from the data store. The open mobile alliance platform transmits a plurality of test mobile phone firmware response messages, the test mobile phone firmware response messages comprising at least a portion of the test mobile phone firmware retrieved from the data store. The test mobile phone firmware response messages are transported over the mobile phone maintenance channel. In response to receiving the test mobile phone firmware response messages, the computer determines a third test result based on comparing the plurality of test mobile phone firmware request messages to the plurality of test mobile phone firmware response messages.

In an embodiment, a method of testing a mobile phone maintenance channel is disclosed. The method comprises generating a plurality of firmware update notification messages by a first computer. The first computer transmits the firmware update notification messages via a first communication path between the first computer and a second computer. In response to receiving the firmware update notification messages, the second computer generates a plurality of first maintenance request messages and a plurality of second maintenance request messages. The first maintenance request messages and the second maintenance request messages are transported over a mobile phone maintenance channel, where the mobile phone maintenance channel comprises a second communication path between the first computer and the second computer and the first communication path is different from the second communication path. In response to receiving the first and second maintenance request messages, the first computer generates and transmits a plurality of maintenance response messages. In response to receiving the maintenance response messages, the second computer determines a test result based on comparing the first and second maintenance request messages with the maintenance response messages.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1A:
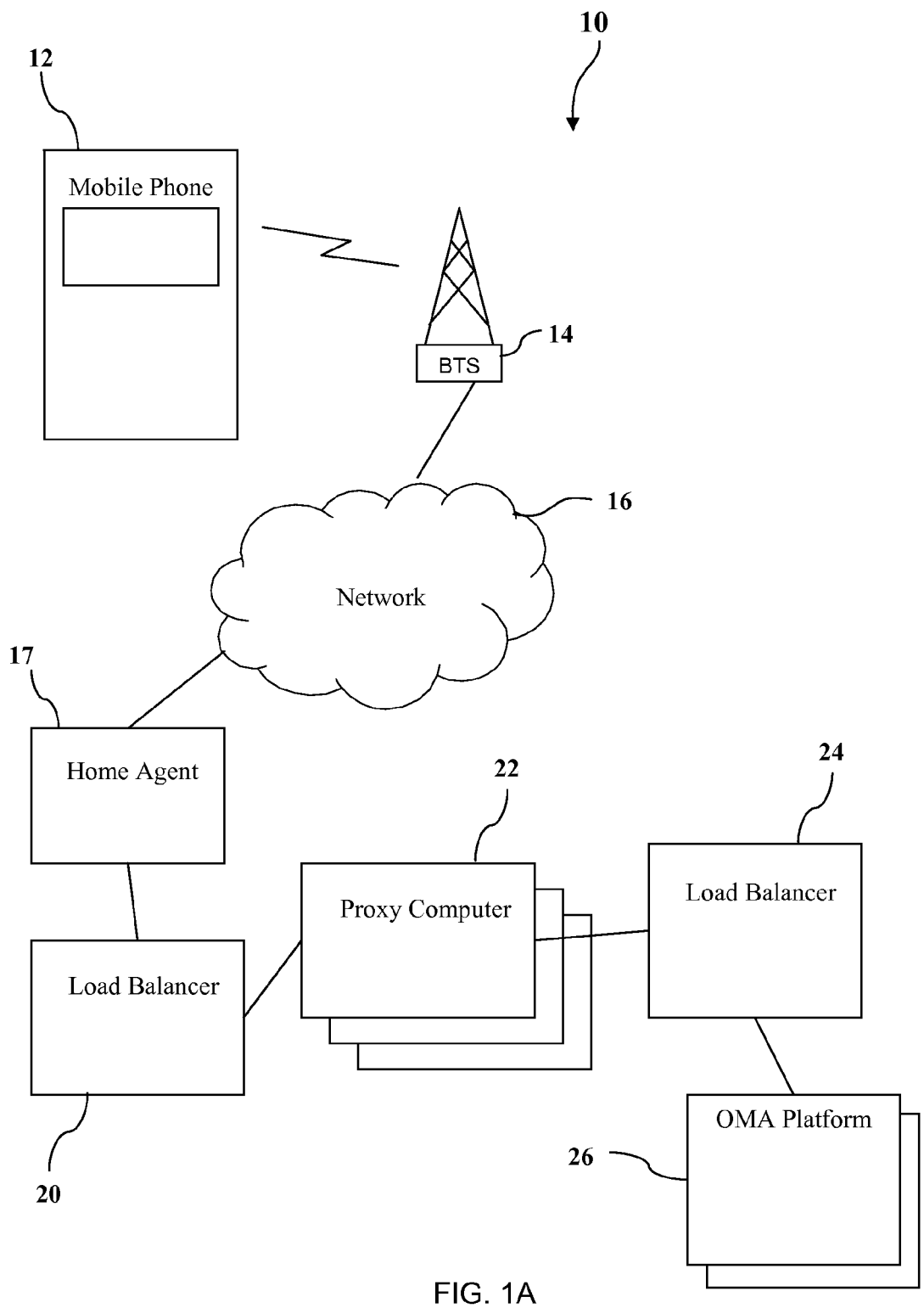
FIG. 1A is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A method of testing a maintenance channel to an open mobile alliance (OMA) platform is described. An open mobile alliance platform may provide provisioning, configuration, and software update functions to mobile telephones. The open mobile alliance platform may interact with the billing system to receive and store information about a mobile phone that has been sold. When the mobile phone is powered on and attempts activation, the activation request is sent to the open mobile alliance platform, which confirms it has information for the mobile phone in its data store and replies to the activation request, enabling the mobile phone to access a service provider's mobile network.

The connection between the mobile phone and the open mobile alliance platform may be established over a plurality of network elements from the mobile network to the portion of the service provider's corporate network specifically segmented for use by the open mobile alliance platform. Testing the open mobile alliance platform over a maintenance channel across the network increases the robustness of the testing and better duplicates the real world scenarios encountered by mobile phone users when accessing the open mobile alliance platform.

A computer may be used to emulate the mobile phone to facilitate testing the maintenance channel to the open mobile alliance platform. An emulator running on the computer duplicates the functions of the mobile phone so that the computer behaves like (and appears to be) the mobile phone to the open mobile alliance platform. The emulator may send a plurality of activation request messages identical to what would be sent by a mobile phone, and receive corresponding activation reply messages from the open mobile alliance platform. The computer running the emulator may then compare the activation request messages to the activation response messages and determine a result of the testing.

In addition to testing the activation sequence over the maintenance channel, the mobile phone emulator may be used to test preferred roaming list update and firmware update functionality of the open mobile alliance platform. The mobile phone emulator may test these functions separately as well as simultaneously with a mix of transactions. The testing may also be triggered by messages sent from the open mobile alliance platform to the mobile phone emulator. For example, the open mobile alliance platform may send a plurality of firmware update notification messages. The mobile phone emulator receives the firmware update notification messages and generates a plurality of firmware request messages, sending them to the open mobile alliance platform over the maintenance channel.

Turning now to FIG. 1A, a communication system 10 is described. The system 10 comprises a mobile phone 12, a base transceiver station (BTS) 14, a network 16, a home agent 17, a first load balancing computer 20, a plurality of proxy computers 22, a second load balancing computer 24, and a plurality of open mobile alliance platform computers 26. The mobile phone 12 may be a mobile phone, a personal digital assistant (PDA), a media player, or other communication enabled computer. The base transceiver station 14 provides a communication link to the mobile phone 12 and couples the mobile phone 12 to the network 16. In an embodiment, the base transceiver station 14 provides a wireless communication link to the mobile phone 12 according to one or more of a code division multiple access (CDMA) wireless protocol, a global system for mobile communications (GSM) wireless protocol, a long term evolution (LTE) wireless protocol, a worldwide interoperability for microwave access (WiMAX) wireless protocol, or another wireless protocol. While a single base transceiver station 14 is illustrated in FIG. 1, it is understood that the communication system 10 may comprise any number of base transceiver stations 14 and any number of mobile phones 12. The network 16 may be a public communication network, a private communication network, or a combination thereof.

The home agent 17 is a router on the home network of the mobile phone 12 that delivers data to the mobile phone 12 when it is away from home. The first load balancing computer 20 is used to distribute maintenance request messages evenly across a plurality of proxy computers 22. The proxy computers 22 act as an intermediary for maintenance request messages from mobile phones 12. The proxy servers 22 evaluate the requests according to filtering rules, sending filtered maintenance request messages to the second load balancer 24. The second load balancing computer 24 distributes the maintenance request messages evenly across a plurality of open mobile alliance platform computers 26.

Figure 1B:
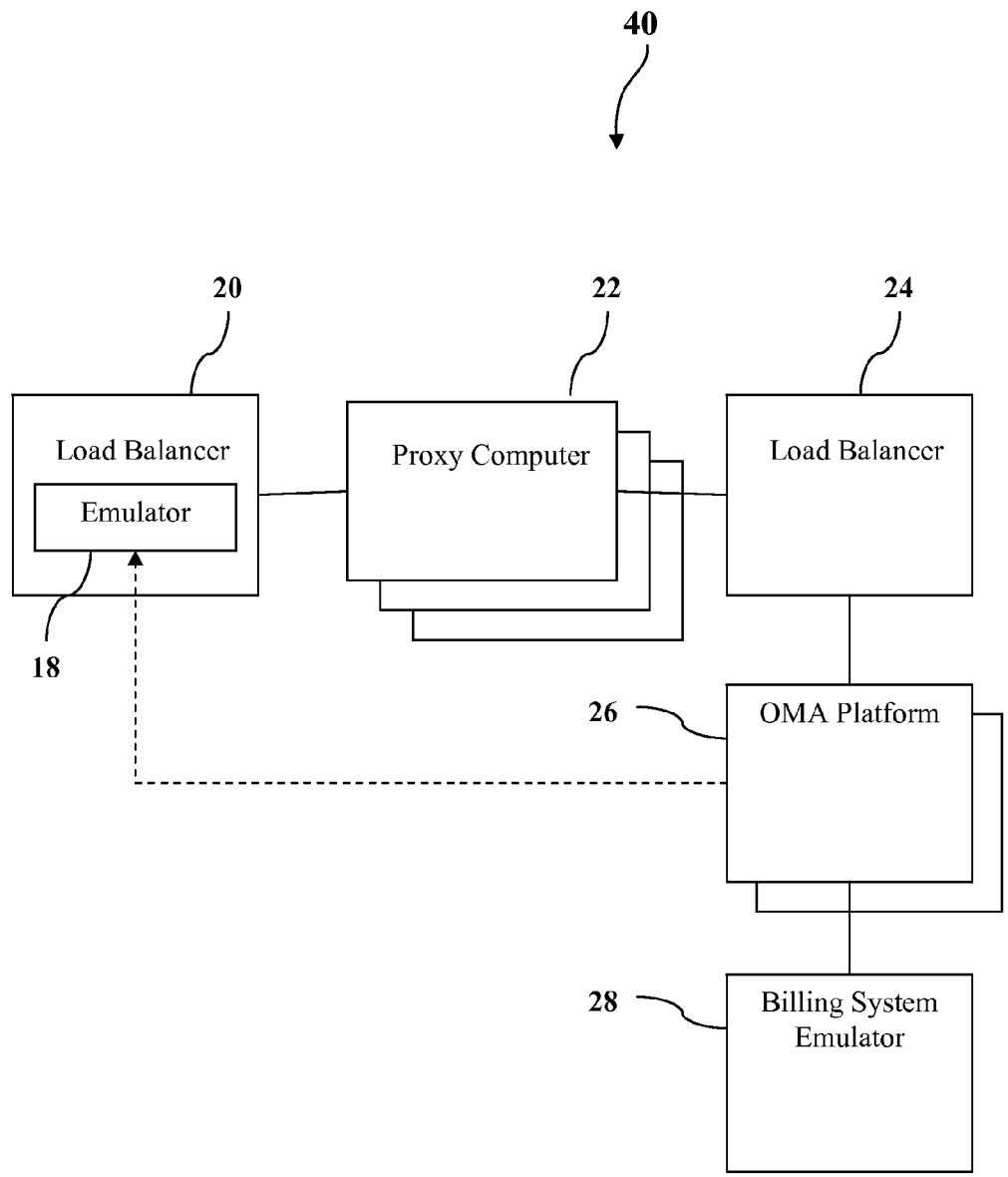
FIG. 1B is a block diagram of a test system according to an embodiment of the disclosure.

Turning now to FIG. 1B, a test system 40 is described. The system 10 comprises a first load balancing computer 20, a plurality of proxy computers 22, a second load balancing computer 24, a plurality of open mobile alliance platform computers 26, and a billing system emulator 28. The test system 40 may be designed to duplicate some of the functionality of the communication system 10 with similar network elements performing like functions in the test system 40, but without live production maintenance requests being handled. A mobile phone emulator 18 may run on a computer on the network with connectivity to a maintenance channel to the open mobile alliance platform 26 and is shown running on the first load balancing computer 20 in the test system 40. The mobile phone emulator 18 may run as a script executed on a lab computer, emulating the injection of maintenance request messages from the home agent 17. The script may be articulated in a variety of languages, for example telnet, Python, Perl, Java, C++, or C. Messages may be tested through to the open mobile alliance platform 26 and back to the mobile phone emulator 18. In an embodiment, the mobile phone maintenance channel comprises at least one first load balancing computer 20. A load balancing computer 20 is used to distribute maintenance request messages evenly across two or more computers, in order to improve resource utilization, to increase throughput, to reduce response time, and to avoid overload.

In an embodiment, the mobile phone maintenance channel comprises a plurality of proxy computers 22 that filter mobile phone activation request messages. The proxy computers 22 act as an intermediary for mobile phone activation requests and evaluate the requests according to their filtering rules. In an embodiment, the proxy computers 22 receive mobile phone activation request messages from the at least one first load balancing computer 20, filter the mobile phone activation request messages, and transmit a plurality of filtered mobile phone activation request messages to the at least one second load balancing computer 24. The second load balancing computer 24 distributes maintenance request messages evenly across the plurality of open mobile alliance platform computers 26, providing redundancy and the ability to increase capacity of the open mobile alliance platform 26 as needed. The proxy computers 22 prevent unauthorized mobile phone activation requests from reaching the open mobile alliance platform 26 and keep the open mobile alliance platform 26 anonymous, preventing direct access to the platform from computer hackers.

The network elements described in the test system 40 and the connectivity between the elements are but one possible implementation of the maintenance channel, and it is understood that the test system 40 may comprise different network elements and different network architecture to provide the maintenance channel. The message flow described may not be direct from one network element to the next. For example, instead of passing maintenance request messages directly to the second load balancing computer 24, the plurality of proxy computers 22 may, upon filtering the maintenance request messages, send an IP address and port number for the second load balancing computer 24 back to the first load balancing computer 20, allowing direct communication between the first load balancing computer 20 and the second load balancing computer 24 for that maintenance session.

In an embodiment, the open mobile alliance platform 26 may notify the mobile phone emulator 18 when it has received new data from the billing system emulator 28, prompting the mobile phone emulator 18 to begin injecting maintenance request messages. The open mobile alliance platform 26 may utilize a second communication channel to directly notify the mobile phone emulator 18.

Figure 2:
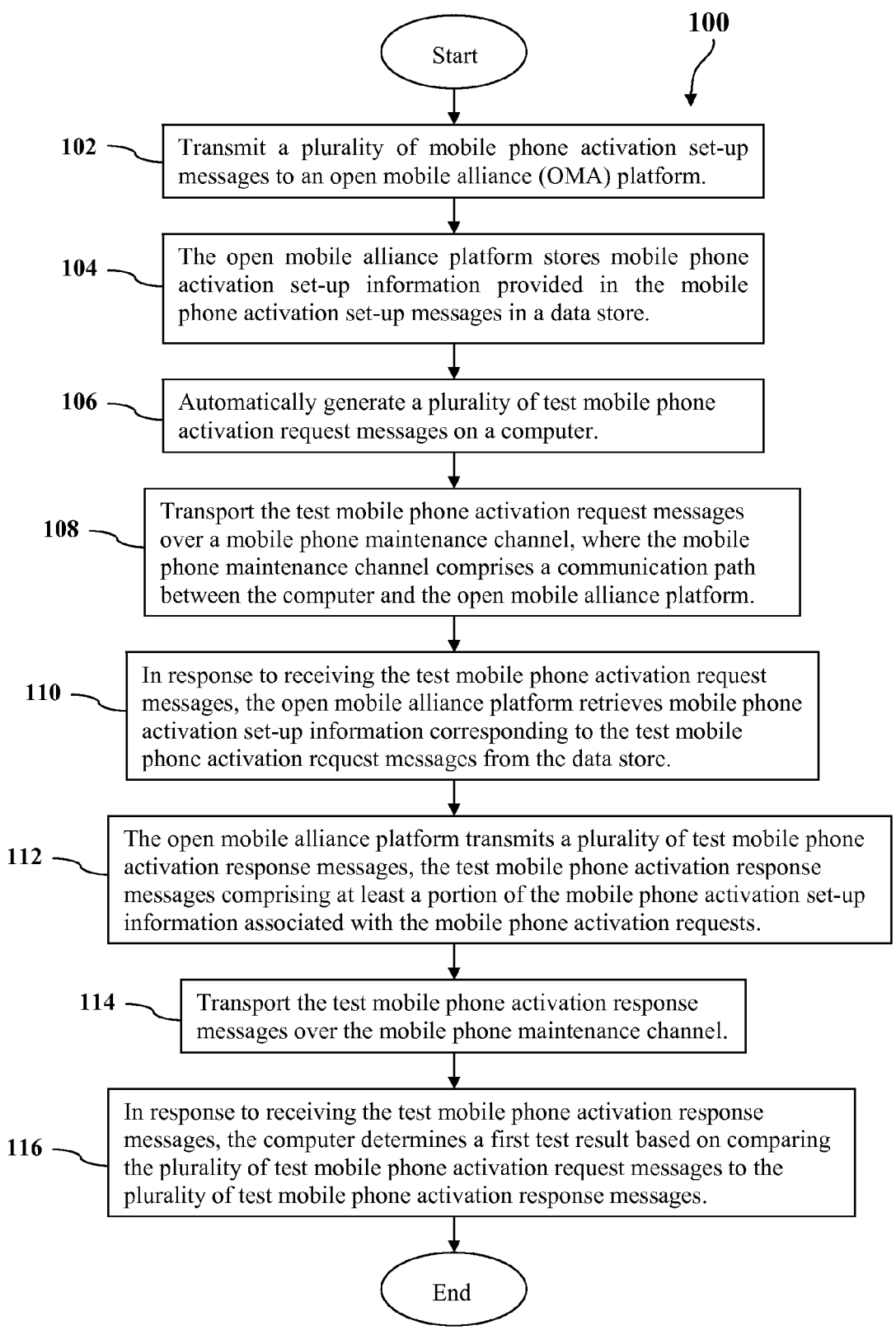
FIG. 2 is a flow chart of a method according to an embodiment of the disclosure.

Turning now to FIG. 2, a method 100 is described. At block 102, a plurality of mobile phone activation set-up messages are transmitted to an open mobile alliance platform. At block 104, the open mobile alliance platform stores mobile phone activation set-up information provided in the mobile phone activation set-up messages in a data store. The mobile phone activation set-up messages are simulating messages received from a billing system when mobile phones are sold and may be expected to send an activation request to the open mobile alliance platform. At block 106, a computer automatically generates a plurality of test mobile phone activation request messages. At block 108, the test mobile phone activation request messages are transported over a mobile phone maintenance channel, where the mobile phone maintenance channel comprises a communication path between the computer and the open mobile alliance platform.

At block 110, in response to receiving the test mobile phone activation request messages, the open mobile alliance platform retrieves mobile phone activation set-up information from the data store corresponding to the test mobile phone activation request messages. The mobile phone activation request messages contain specific identification information which the open mobile alliance platform may use to match and retrieve the appropriate mobile phone activation set-up information. At block 112, the open mobile alliance platform transmits a plurality of test mobile phone activation response messages, the test mobile phone activation response messages comprising at least a portion of the mobile phone activation set-up information associated with the mobile phone activation requests.

At block 114, the test mobile phone activation response messages are transported over the mobile phone maintenance channel. At block 116, in response to receiving the test mobile phone activation response messages, the computer determines a first test result based on comparing the plurality of test mobile phone activation request messages to the plurality of test mobile phone activation response messages. The computer compares the test mobile phone activation response messages received against the test mobile phone activation request messages sent out and verifies the results match what is expected from the open mobile alliance platform.

In an embodiment, the method 100 further comprises the computer automatically generating a plurality of test mobile phone maintenance request messages and transporting the test mobile phone maintenance request messages over the mobile phone maintenance channel. The test mobile phone maintenance request messages may request additional functions or updates and may be performed separately or simultaneously. Based on receiving the mobile phone maintenance request messages, the open mobile alliance platform generates test mobile phone maintenance response messages. The test mobile phone maintenance response messages are transported over the mobile phone maintenance channel. In response to receiving the test mobile phone maintenance response messages, the computer determines a second test result based on comparing the plurality of test mobile phone maintenance request messages to the plurality of test mobile phone response messages.

In an embodiment, the test mobile phone maintenance request messages request one of a preferred roaming list update or a firmware update. The open mobile alliance platform may also support enhanced functionality such as preferred roaming lists based on zip code and lock and wipe management. Instead of providing a single preferred roaming list for all update requests, the open mobile alliance platform may store multiple regional preferred roaming lists, and may send out the appropriate regional preferred roaming list based on a zip code received in the maintenance request message or by other geographic location methods such as global positioning system (GPS) data.

Figure 3:
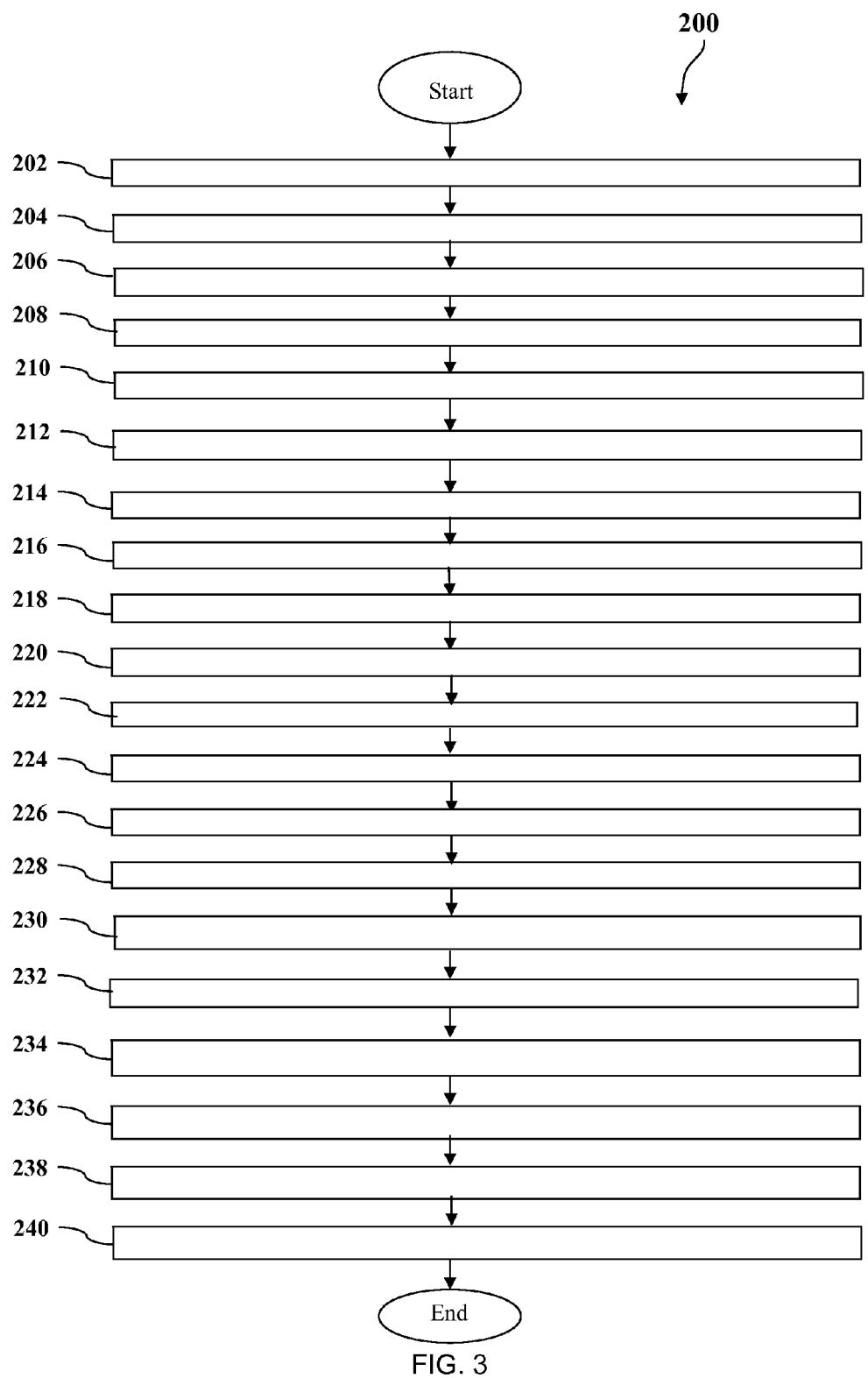
FIG. 3 is a flow chart of a method according to an embodiment of the disclosure.

Turning now to FIG. 3, a method 200 is described. At block 202, a plurality of mobile phone activation set-up messages are transmitted to an open mobile alliance platform. At block 204, the open mobile alliance platform stores mobile phone activation set-up information provided in the mobile phone activation set-up messages in a data store. The mobile phone activation set-up messages are simulating messages received from a billing system when mobile phones are sold and may be expected to send an activation request to the open mobile alliance platform.

At block 206, a computer automatically generates a plurality of test mobile phone activation request messages. At block 208, the test mobile phone activation request messages are transported over a mobile phone maintenance channel, where the mobile phone maintenance channel comprises a communication path between the computer and the open mobile alliance platform. At block 210, in response to receiving the test mobile phone activation request messages, the open mobile alliance platform retrieves mobile phone activation set-up information from the data store corresponding to the test mobile phone activation request messages. The mobile phone activation request messages contain specific identification information which the open mobile alliance platform may use to match and retrieve the appropriate mobile phone activation set-up information.

At block 212, the open mobile alliance platform transmits a plurality of test mobile phone activation response messages, the test mobile phone activation response messages comprising at least a portion of the mobile phone activation set-up information associated with the mobile phone activation requests. At block 214, the test mobile phone activation response messages are transported over the mobile phone maintenance channel. At block 216, in response to receiving the test mobile phone activation response messages, the computer determines a first test result based on comparing the plurality of test mobile phone activation request messages to the plurality of test mobile phone activation response messages. At block 218, the computer automatically generates a plurality of test mobile phone preferred roaming list (PRL) request messages.

At block 220, the test mobile phone preferred roaming list request messages are transported over the mobile phone maintenance channel. At block 222, in response to receiving the test mobile phone preferred roaming list request messages, the open mobile alliance platform retrieves mobile phone preferred roaming list information from the data store. At block 224, the open mobile alliance platform transmits a plurality of test mobile phone preferred roaming list response messages, the test mobile phone preferred roaming list response messages comprising at least a portion of the mobile phone preferred roaming list information retrieved from the data store. At block 226, the test mobile phone preferred roaming list response messages are transported over the mobile phone maintenance channel. At block 228, in response to receiving the test mobile phone preferred roaming list response messages, the computer determines a second test result based on comparing the plurality of test mobile phone preferred roaming list request messages to the plurality of test mobile phone preferred roaming list response messages.

At block 230, the computer automatically generates a plurality of test mobile phone firmware request messages. At block 232, the test mobile phone firmware request messages are transported over the mobile phone maintenance channel. At block 234, in response to receiving the test mobile phone firmware request messages, the open mobile alliance platform retrieves mobile phone firmware from the data store. At block 236, the open mobile alliance platform transmits a plurality of test mobile phone firmware response messages, the test mobile phone firmware response messages comprising at least a portion of the firmware retrieved from the data store. At block 238, the test mobile phone firmware response messages are transported over the mobile phone maintenance channel. At block 240, in response to receiving the test mobile phone firmware response messages, the computer determines a third test result based on comparing the plurality of test mobile phone firmware request messages to the plurality of test mobile phone firmware response messages.

In an embodiment, the test mobile phone activation request messages contain malformed packets. The test method provides the framework to perform negative testing, which is testing to determine system results with unexpected input. Malformed packets could be packets that are corrupted and do not match the proper format of the message protocol, or they may be packets containing bad data in the data fields, such as when a computer hacker is attempting to access a secure network. Negative testing may provide the ability to identify issues that occur outside of the scope of normal operation and may be useful in preventing unexpected results. The test method supports negative testing of the complete communication path between the computer and the open mobile alliance platform. In an embodiment, the mobile phone maintenance channel comprises at least one load balancing computer, where transporting the request messages over the mobile phone maintenance channel comprises at least one load balancing computer receiving the request messages from the computer and transmitting at least some of the request messages to the open mobile alliance platform. Using load balancing may increase reliability through redundancy, and provide the ability to increase capacity transparently to the rest of the maintenance channel.

In an embodiment, the mobile phone maintenance channel further comprises a plurality of proxy computers. A proxy computer acts as an intermediary for requests and evaluates the requests according to its filtering rules. Transporting the request messages over the mobile phone maintenance channel further comprises at least one load balancing computer transmitting the request messages to the plurality of proxy computers according to a load balancing algorithm. The plurality of proxy computers then filter the request messages and transmit the filtered messages to at least one load balancing computer, where the at least one load balancing computer transmits the filtered request messages to the open mobile alliance platform. To clarify, the maintenance channel may comprise at least one load balancing computer sending the request messages to a plurality of proxy computers, which filter the requests and send the filtered request messages to a second at least one load balancing computer. The second at least one load balancing computer transmits the filtered request messages to the open mobile alliance platform.

In an embodiment, automatically generating the test mobile phone activation request messages, the test mobile phone preferred roaming list request messages, and the test mobile phone firmware request messages is based on a predetermined ratio among the numbers of the test mobile phone activation request messages, the numbers of the test mobile phone preferred roaming list request messages, and the numbers of the test mobile phone firmware request messages. The test script can be programmed with a predefined ratio, such as 50% activation requests, 30% preferred roaming list requests, and 20% firmware requests, and the test mobile phone request messages sent match these ratios.

In an embodiment, the method 200 further comprises determining the ratio among the numbers of the test mobile phone activation request messages, the numbers of the test mobile phone preferred roaming list request messages, and the numbers of the test mobile phone firmware request messages based on analyzing a history of mobile phone maintenance request messages generated in an active communication network. For example, if statistics gathered from the live production communication network indicate that 40% of the requests received are activation request messages, 30% are preferred roaming list request messages, and 30% are firmware request messages, the mixture of automatically generated test mobile phone messages may be set to match these ratios.

In an embodiment, the method 200 also comprises the open mobile alliance platform automatically generating a lock check request message. The lock check request message is transmitted by the open mobile alliance platform and transported over the mobile phone maintenance channel. The computer, in response to receiving the lock check request message, generates a lock check response message. The lock check response will provide the open mobile alliance platform with the current computer lock status. A computer may be locked to protect the data on the device when it is lost or stolen. The lock check response message is transmitted by the computer and transported over the mobile phone maintenance channel. In response to receiving the lock check response message, the open mobile alliance platform determines a fourth test result based on comparing the lock check response message with the lock check request message. In addition to locking a computer, the open mobile alliance platform may be used to perform a lock and wipe function on a device.

Figure 4:
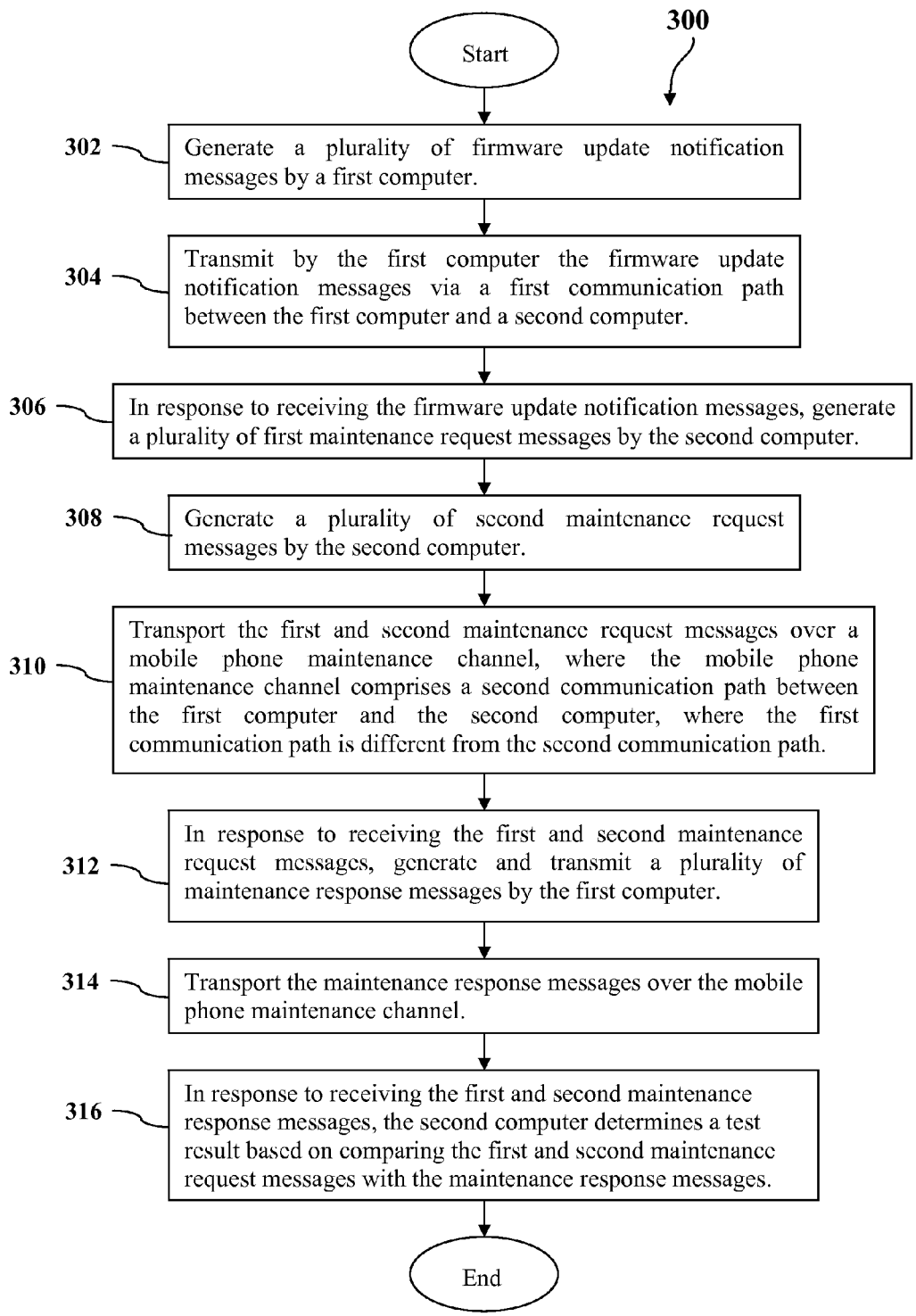
FIG. 4 is a flow chart of a method according to an embodiment of the disclosure.

Turning now to FIG. 4, a method 300 is described. At block 302, a plurality of firmware update notification messages are generated by a first computer. At block 304, the firmware update notification messages are transmitted via a first communication path between the first computer and a second computer. At block 306, in response to receiving the firmware update notification messages, a plurality of first maintenance request messages are generated by the second computer. At block 308, a plurality of second maintenance request messages are generated by the second computer. At block 310, the first and second maintenance request messages are transported over a mobile phone maintenance channel, where the mobile phone maintenance channel comprises a second communication path between the first computer and the second computer, where the first communication path is different from the second communication path. At block 312, in response to receiving the first and second maintenance request messages, the first computer generates and transmits a plurality of maintenance response messages. At block 314, the maintenance response messages are transported over the mobile phone maintenance channel. At block 316, in response to receiving the first and second maintenance response messages, the second computer determines a test result based on comparing the first and second maintenance request messages with the maintenance response messages.

In an embodiment, the second maintenance request messages comprise at least one activation request message. In an embodiment, the second maintenance request messages comprise at least one preferred roaming list message. A mix of message types may be used to test real-world scenarios. Following receipt of a firmware update notification, it may be common in real-world use to also check for updates to other mobile phone software components and send a second maintenance request.

In an embodiment, the first computer provides an open mobile alliance functionality. When a new firmware is delivered to an open mobile alliance computer, it may send out firmware update notification messages to alert mobile phones to check for new firmware or use other means to notify the mobile phones. In an embodiment, the first communication path transports short message service (SMS) messages and wireless application protocol (WAP) services. The notification messages may be sent using short message service or wireless application protocols between the first and second computer.

In an embodiment, comparing the first and second maintenance request messages and the maintenance response messages comprises correlating the maintenance response messages to test case definitions accessed based on the first and second maintenance request messages. For example, when a firmware update notification message is received, the second computer runs a test script that executes test cases which define the first and second maintenance request messages to be sent. In an embodiment, the test case definitions identify an expected content of the maintenance response messages. The test case defines both the request messages to be sent and the expected content of the response messages, and correlates this data to determine the success or failure of the test case.

Figure 5:
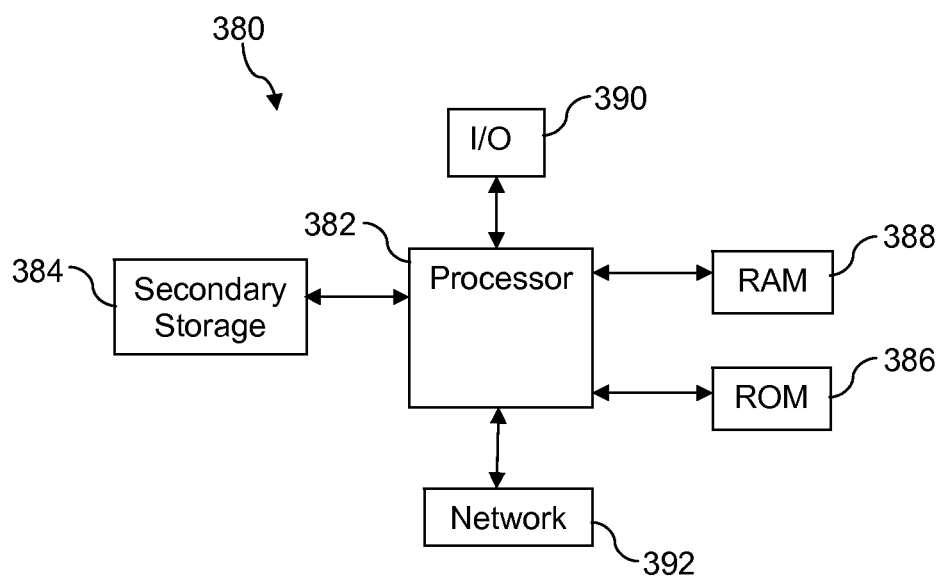
FIG. 5 is a block diagram of a computer system according to an embodiment of the disclosure.

FIG. 5 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave generated by the network connectivity devices 392 may propagate in or on the surface of electrical conductors, in coaxial cables, in waveguides, in an optical conduit, for example an optical fiber, or in the air or free space. The information contained in the baseband signal or signal embodied in the carrier wave may be ordered according to different sequences, as may be desirable for either processing or generating the information or transmitting or receiving the information. The baseband signal or signal embodied in the carrier wave, or other types of signals currently used or hereafter developed, may be generated according to several methods well known to one skilled in the art. The baseband signal and/or signal embodied in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, a baseband signal and/or a signal embodied in a carrier wave may be referred to as a transitory signal. In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of testing a mobile phone maintenance channel, comprising:
    transmitting a plurality of mobile phone activation set-up messages to an open mobile alliance (OMA) platform;
    the open mobile alliance platform storing mobile phone activation set-up information provided in the mobile phone activation set-up messages in a data store;
    automatically generating a plurality of test mobile phone activation request messages on a computer;
    transporting the test mobile phone activation request messages over a mobile phone maintenance channel, wherein the mobile phone maintenance channel comprises a communication path between the computer and the open mobile alliance platform;
    the open mobile alliance platform, in response to receiving the test mobile phone activation request messages, retrieving mobile phone activation set-up information corresponding to the test mobile phone activation request messages from the data store;
    the open mobile alliance platform transmitting a plurality of test mobile phone activation response messages, the test mobile phone activation response messages comprising at least a portion of the mobile phone activation set-up information associated with the test mobile phone activation request;
    transporting the test mobile phone activation response messages over the mobile phone maintenance channel;
    the computer, in response to receiving the test mobile phone activation response messages, determining a first test result based on comparing the plurality of test mobile phone activation request messages to the plurality of test mobile phone activation response messages;
    automatically generating a plurality of test mobile phone preferred roaming list (PRL) request messages on the computer;
    transporting the test mobile phone preferred roaming list request messages over the mobile phone maintenance channel;
    the open mobile alliance platform, in response to receiving the test mobile phone preferred roaming list request messages, retrieving mobile phone roaming list information from the data store;
    the open mobile alliance platform transmitting a plurality of test mobile phone preferred roaming list response messages, the test mobile phone preferred roaming list response messages comprising at least a portion of the mobile phone roaming list information retrieved from the data store;
    transporting the test mobile phone preferred roaming list response messages over the mobile phone maintenance channel;
    the computer, in response to receiving the test mobile phone preferred roaming list response messages, determining a second test result based on comparing the plurality of test mobile phone preferred roaming list request messages to the plurality of test mobile phone preferred roaming list response messages;
    automatically generating a plurality of test mobile phone firmware request messages on the computer;
    transporting the test mobile phone firmware request messages over the mobile phone maintenance channel;
    the open mobile alliance platform, in response to receiving the test mobile phone firmware request messages, retrieving firmware from the data store;
    the open mobile alliance platform transmitting a plurality of test mobile phone firmware response messages, the test mobile phone firmware response messages comprising at least a portion of the firmware retrieved from the data store;
    transporting the test mobile phone firmware response messages over the mobile phone maintenance channel; and
    the computer, in response to receiving the test mobile phone firmware response messages, determining a third test result based on comparing the plurality of test mobile phone firmware request messages to the plurality of test mobile phone firmware response messages.

2. The method of claim 1, wherein the test mobile phone activation request messages contain malformed packets.

3. The method of claim 1, wherein the mobile phone maintenance channel comprises at least one load balancing computer and wherein transporting the request messages over the mobile phone maintenance channel comprises:
    the at least one load balancing computer receiving the request messages from the computer; and
    the at least one load balancing computer transmitting at least some of the request messages to the open mobile alliance platform.

4. The method of claim 3, wherein the mobile phone maintenance channel further comprises a plurality of proxy computers and wherein transporting the request messages over the mobile phone maintenance channel further comprises:

the at least one load balancing computer transmitting the request messages to the plurality of proxy computers according to a load balancing algorithm;

the plurality of proxy computers filtering the request messages; and the plurality of proxy computers transmitting filtered request messages to the at least one load balancing computer, wherein the at least one load balancing computer transmitting at least some of the requested messages to the open mobile alliance platform comprises the at least one load balancing computer transmitting the filtered request messages to the open mobile alliance platform.

5. The method of claim 1, wherein automatically generating the test mobile phone activation request messages, the test mobile phone preferred roaming list request messages, and the test mobile phone firmware request messages is based on a predetermined ratio among the numbers of the test mobile phone activation request messages, the numbers of the test mobile phone preferred roaming list request messages, and the numbers of the test mobile phone firmware request messages.

6. The method of claim 5, further comprising determining the ratio among the numbers of the test mobile phone activation request messages, the numbers of the test mobile phone preferred roaming list request messages, and the numbers of the test mobile phone firmware request messages based on analyzing a history of mobile phone maintenance request messages generated in an active communication network.

7. The method of claim 1, further comprising:

the open mobile alliance platform automatically generating a lock check request message;

the open mobile alliance platform transmitting the lock check request message;

transporting the lock check request message over the mobile phone maintenance channel;

the computer, in response to receiving the lock check request message, generating a lock check response message;

the computer transmitting the lock check response message;

transporting the lock check response message over the mobile phone maintenance channel; and the open mobile alliance platform, in response to receiving the lock check response message, determining a fourth test result based on comparing the lock check response message with the lock check request message.

* * * * *